Feb. 24, 1931.　　　M. HESSE　　　1,794,075
SHAKING SIFTER
Filed Jan. 16, 1928
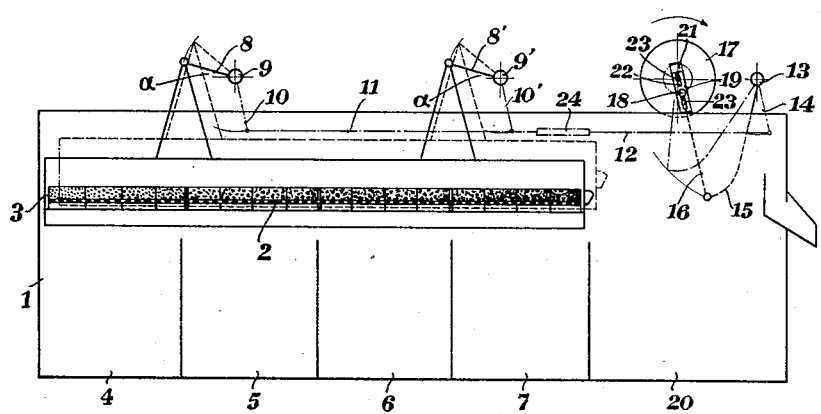
Inventor
Max Hesse
By Knight Bro
attys Patented Feb. 24, 1931

1,794,075

UNITED STATES PATENT OFFICE

MAX HESSE, OF MAGDEBURG-BUCKAU, GERMANY, ASSIGNOR TO THE FIRM FRIED. KRUPP GRUSONWERK AKTIENGESELLSCHAFT, OF MAGDEBURG-BUCKAU, GERMANY

SHAKING SIFTER

Application filed January 16, 1928, Serial No. 247,203, and in Germany January 17, 1927.

This invention relates to a shaking sifter, for example for washing coal, coke, ore and the like in which the sieve simultaneously executes an up and down movement and a lateral movement in order to gradually move the material delivered at one end of the sieve to the discharge end thereof, the ore bearing material or the like being sifted out on the way. In accordance with the invention a driving mechanism for the sieve is so arranged that the motion of the sieve in vertical as well as horizontal direction can be adjusted in a simple manner. In the driving mechanism a crank is used, the free end of the crank rod being so guided that the angular path of the crank pin during the motion of the crank rod from one limit position to the other is greater than during the motion of the crank rod in the opposite direction and the downward motion of the crank rod is made faster than its upward motion. There is furthermore inserted in the connection between the crank drive and the sieve shaking mechanism a device for regulating the lateral motion of the sieve. By radially adjusting the crank pin the stroke of the sieve can also be adjusted. The driving mechanism according to the invention permits an exact regulation of great amplitude of the stroke of the sieve as well as its lateral motion; it is simple in its construction and furthermore has the advantage that the adjustment of the lateral motion of the sieve can be accomplished at a single position during the operation of the sifter.

The drawing shows diagrammatically one embodiment of the invention in longitudinal section.

Into the container 1 which is filled with liquid dips the box 3 bearing the sieve 2. The holes of the sieve are arranged in zones, each zone, counting from the charging end toward the discharging end, having holes of larger size than the preceding zone. Under the sieve 2 are the compartments 4, 5, 6 and 7 for the ore bearing material or the like which is sifted through the sieve. In the compartment 20 are collected the larger rocks which do not pass through the sieve. The sieve itself is covered with a layer of granular material such as iron through which the ore bearing material or the like is sifted. The sieve box 3 is suspended from the levers 8 and 8' which are non-rotatably mounted upon the shafts 9 and 9' respectively. Each of the shafts 9 and 9' carries also a lever 10, 10', the latter being connected by a connecting rod 11. To the lever 10' is connected a connecting rod 12 whose free end is coupled to a lever 14 non-rotatably mounted upon a shaft 13. The shaft 13 also carries a non-rotatably mounted lever 15, the free end of which is connected to one end of a crank rod 16, the other end of which is connected to the crank pin 18 of a crank disk 17. When the crank disk 17 is rotated the crank rod 16 executes a swinging motion which causes a relatively slow upward movement of the sifting box, and a relatively fast downward movement thereof, because the angular path traversed by the crank pin 18 during the upward motion of the crank rod is greater than during its downward motion. The crank pin 18 is fastened to a slide 19 which is radially adjustable in a guide slot 21 in the crank disk. The slide is provided with elongated holes 22 through which project bolts 23 secured to the crank disk 17 by which the slide can be secured in the desired position upon the disk. The further the crank pin 18 is from the center of the crank disk the greater is the stroke of the sieve box. In the connecting rod 12 is inserted a turnbuckle 24 through which the working length of the connecting rod 12 can be changed. By adjustment of the turnbuckle the positions of the levers 8 and 8' are also adjusted and by increasing or decreasing their angle with respect to horizontal the lateral motion of the sieve box and therefore its throwing motion can be increased or decreased.

In other respects the shaking sifter may have any desired construction.

Having described my invention, I claim:

In a sieve actuating mechanism of the kind described, the combination of a pivotally mounted two arm rock lever, a sieve mounted upon one arm of said lever, a connecting rod connected to the other arm of said lever, means for reciprocating said rod and means for varying the working length of said rod, said means for reciprocating said rod comprising a crank, a crank rod pivoted to said crank, means for controlling the movements of said crank and rod in such a manner that the angular distance traversed by said crank while the free end of said crank rod moves from one limit position to another in one direction is greater than that traversed during the return movement of the free end of said crank rod, and connections between the free end of said crank rod and said connecting rod for reciprocating said connecting rod in accordance with the movement of the free end of said crank rod.

The foregoing specification signed at Berlin this 23rd day of December, 1927.

MAX HESSE.